United States Patent [19]

Mitani

[11] Patent Number: 4,578,770
[45] Date of Patent: Mar. 25, 1986

[54] METHOD OF DISCRIMINATING SHEET

[75] Inventor: Tsuneyoshi Mitani, Kawasaki, Japan

[73] Assignee: Musashi Engineering Kabushiki Kaisha, Tokyo, Japan

[21] Appl. No.: 502,525

[22] Filed: Jun. 10, 1983

[30] Foreign Application Priority Data

Aug. 30, 1982 [JP] Japan .................................. 57-149212

[51] Int. Cl.$^4$ ...................... G01C 25/00; G01N 21/88
[52] U.S. Cl. .................................... 364/571; 250/562; 364/154; 382/7
[58] Field of Search ............... 364/148, 153, 154, 516, 364/525, 571, 507; 382/7, 14; 250/214 C, 556, 562, 572; 356/71

[56] References Cited

U.S. PATENT DOCUMENTS

| | | | |
|---|---|---|---|
| 3,818,198 | 6/1974 | Walker et al. | 364/571 X |
| 3,881,651 | 5/1975 | Wilhelm, Jr. | 364/154 |
| 4,121,291 | 10/1978 | Hoffner et al. | 364/571 |
| 4,184,081 | 1/1980 | Bergamini | 250/556 |
| 4,237,539 | 12/1980 | Piovoso et al. | 250/562 X |
| 4,249,244 | 2/1981 | Shofner et al. | 364/571 X |
| 4,464,786 | 8/1984 | Nishito et al. | 382/7 |
| 4,494,183 | 1/1985 | Bayer et al. | 364/154 |

OTHER PUBLICATIONS

*IEEE Trans Aerospace & Electronic;* May 1977; "Adaptive Thresholding Systems"; Torrieri, pp. 273-280.
*IBM Tech. Disc. Bulletin;* Jul. 1979 (V 22, N 2); "Automatic LED/Phototransistor Calibration Circuit"; Beirne et al., p. 800.
*IBM Tech. Disc. Bulletin;* Aug. 1981 (V 24, N 3); "Automatic Calibration of Scanner Compensation Apparatus"; Bushaw et al., pp. 1652-1654.

*Primary Examiner*—Errol A. Krass
*Assistant Examiner*—Kevin J. Teska
*Attorney, Agent, or Firm*—Brooks Haidt Haffner & Delahunty

[57] ABSTRACT

In a method of discriminating a sheet of the present invention, a comparison and discrimination value becoming the reference of the comparison and discrimination of a printing pattern data is updated whenever the preceding sheet passes through a photodetector. Accordingly, the comparison and discrimination of the following sheet is performed based on the updated comparison and discrimination value, and is not affected by the variation in the sensitivity of the photodetector.

3 Claims, 13 Drawing Figures

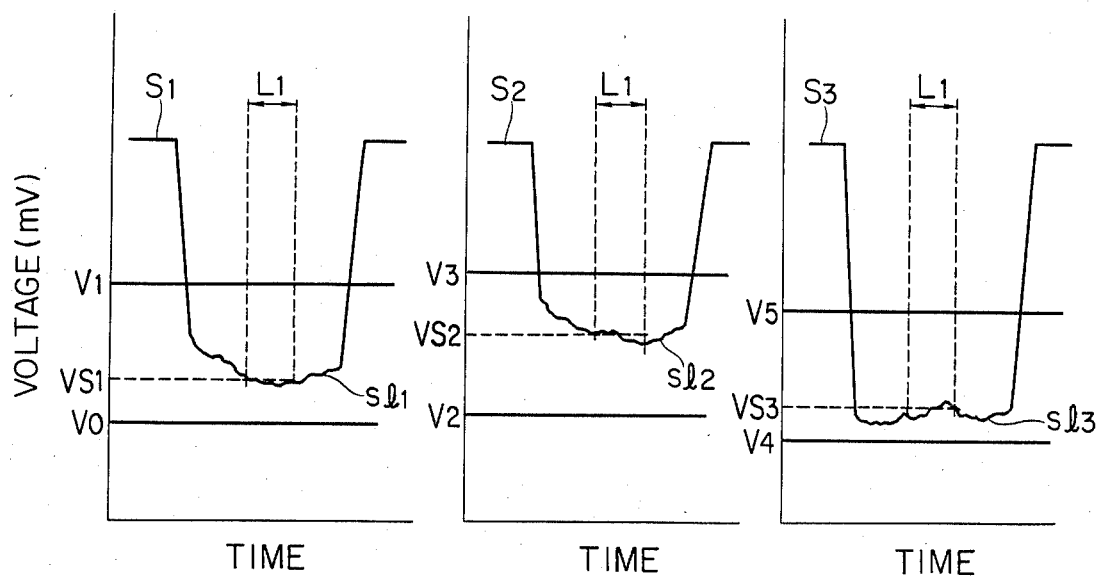
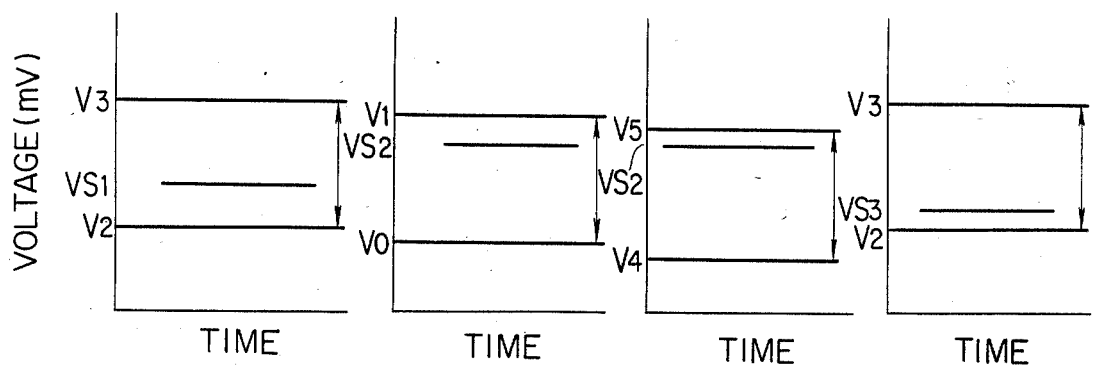

METHOD OF DISCRIMINATING SHEET

BACKGROUND OF THE INVENTION

The present invention relates to a method of discriminating a sheet and, more particularly, to a method of discriminating the defect of a plurality of bank notes of the same type and the conveying defect of the bank note.

A bank note counter for counting, e.g., a plurality of bank notes of the same type, counts the notes passing one by one before a detector, and simultaneously detects the defect of the note itself (e.g., a mixture of a bank note of different type, a contamination, a deformation, and the turning of the note inside out) as well as the conveying defect of the note (e.g., the posture of the note, feeding of superposed notes, or continuous notes), thereby stopping the note counting operation of the counter when the defect is detected. As a conventional method of detecting such defect, there is, for example, a method comprising the steps of setting and storing as set values the printing pattern of a reference bank note preselected for each type of notes in a memory, and comparing the printing pattern signal of the detected note from the detector with the set printing pattern value signal from the memory. The detector operates, for example in a light transmission type, to emit a light from a light source to a bank note to be detected and to receive the light passed through the note by a photodetector, thereby producing the pattern signal of the bank note.

However, when the defect of the note is thus discriminated, the normal note may be erroneously discriminated as the defective note. Because paper powder, dusts on the note and printing ink adhere the detector, and because the detecting sensitivity of the detector is gradually deteriorated according to the aging decrease in the luminous intensity of the light source, the difference between the printing pattern of the reference note set and stored in the memory and the printing pattern detected by the detector gradually becomes large.

Therefore, it has been desired to provide a method of discriminating a sheet which can eliminate the above mentioned disadvantages and hence, which is not affected by the influence of the aging of a detector.

SUMMARY OF THE INVENTION

According to the present invention, there is provided a method of discriminating sheets comprising the steps of passing one by one a plurality of sheets of the same type before the front surface of at least one photodetector, producing printing pattern signals of the respective sheets from the photodetector and discriminating the defect of the sheet based on the printing pattern signals, characterized by the steps of: generating pulses while each sheet is passing before said photodetector and counting the number of pulses for determining the length of each sheet; erasing the first printing pattern signal of the first sheet stored previously in a pattern memory and storing the next, second printing pattern signal of the second sheet passing before said photodetector in said pattern memory with the corresponding pulses; calculating a second comparison and discrimination value based on the second printing pattern signal corresponding to the predetermined part in the length of said sheet and storing the second calculated comparison and discrimination value in a discrimination value memory; mutually comparing a first comparison and discrimination value stored in a reference value memory with the second comparison and discrimination value stored in said discrimination value memory; self-discriminating the second printing pattern signal stored in said pattern memory at present with the second comparison and discrimination value when the result of a discrimination based on the mutual comparison is normal; and erasing the first comparison and discrimination value stored in said reference value memory when the result of a discrimination based on the self-discrimination is normal and transferring the second comparison and discrimination value stored in said discrimination value memory into said reference value memory.

BRIEF DESCRIPTION OF THE DRAWINGS

The invention will become more readily apparent from the following description of a preferred embodiment thereof shown, by way of example only, in the accompanying drawings, in which:

FIGS. 2 through 7 are waveform diagrams for describing a method of discriminating a sheet according to an embodiment of the present invention.

DESCRIPTION OF THE PREFERRED EMBODIMENT

Figure 1:
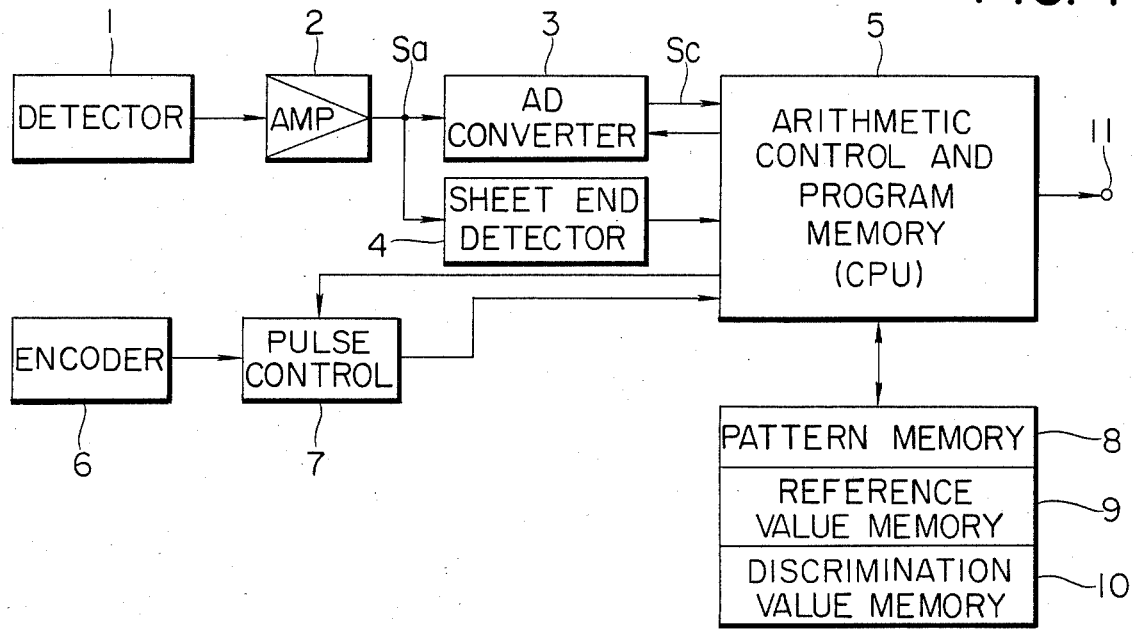
FIG. 1 is a block circuit diagram for describing an embodiment of the present invention.

An embodiment of the present invention will now be described with reference to the accompanying drawings. In FIG. 1, the output of a photodetector 1 is connected to an amplifier 2, and the output of the amplifier 2 is connected to an analog-to-digital (A/D) converter 3 and an end detector 4. The outputs of the converter 3 and the detector 4 are connected to an arithmetic controller and program memory (hereinafter called "a CPU") 5, a pulse output from an encoder 6 is applied to a pulse controller 7, and the output of the controller 7 is connected to the CPU 5. Further, a pattern memory 8, a reference value memory 9 and a discrimination value memory 10 are connected to the CPU 5, and an output terminal 11 for outputting a defect signal when a defect is produced is connected to the CPU 5.

The operation of the circuit in FIG. 1 will be described with reference to FIGS. 2 to 7. When the end of a bank note arrives at the photodetector 1, a signal is fed from the photodetector 1 through the amplifier 2 to the end detector 4, which in turn transmits a signal for notifying the passage of the end of the note to the CPU 5 and hence, the controller 7. The controller 7 thus receiving the end passage signal, applies the pulses from the encoder 6, which is always generating the pulses, to the CPU 5, the rate of the generation of the pulses being synchronous with the progress of the note while the note is passing through the photodetector 1 (see pulse signal Sb in FIG. 2). The CPU 5 thus receiving the signal from the detector 4 produces a start signal to the converter 3, and inputs the printing pattern signal (signal Sa in FIG. 2) of the note passing through the photodetector 1, synchronously with the encoder pulse Sb fed from the controller 7 from the output side of the converter 3. (signal Sc in FIG. 2)

Figure 2:
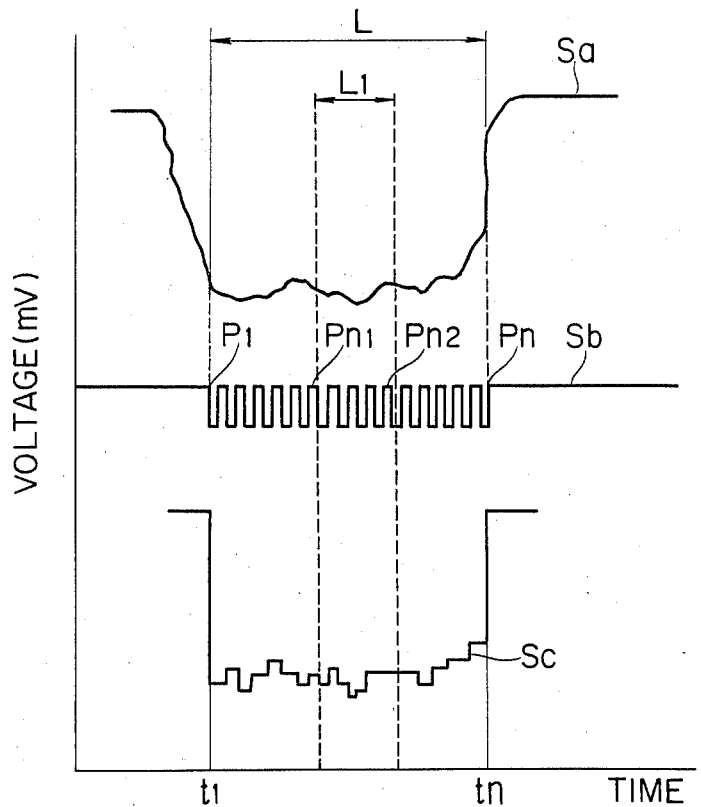

The signals Sa and Sc shown in FIG. 2 are also shown as the printing pattern signal of the note at the input side of the converter 3 and the printing pattern signal of the note applied from the converter 3 to the CPU 5 in FIG. 1. Reference character L in FIG. 2 represents the total number of the encoder pulses, i.e., the length of the note, and the CPU 5 collects the printing pattern signal Sc of the note synchronously with the pulses during the length L.

A method of discriminating the defect and the conveying defect of the note based on the printing pattern data Sc from the converter 3 inputted to the CPU 5 will be described with the example of the case that the three continuous notes shown in FIG. 3(a)–(c) are passed.

FIG. 3(a)–(c) shows signals $S_1$, $S_2$ and $S_3$ which are applied from the converter 3 to the CPU 5 in the case where the first, second and third notes continuously pass before the photodetector 3. When the first note initially passes, the printing pattern signal $S1_1$ in FIG. 3(a) is temporarily erasably stored in the pattern memory 8. Then, the CPU 5 calculates the average value $VS_1$ at the length $L_1$ of the note of the printing pattern signal $S1_1$ and predetermined range $V_0$ to $V_1$ with the average value as a reference as a comparison and discrimination value. The length $L_1$ of the note is calculated and specified in the range of $P_{n1}$ to $P_{n2}$ by calculating the number of pulses $P_1$ to $P_n$ as shown in FIG. 2. When the first note is the note which has initially passed, the comparison and discrimination value of the average value $VS_1$ and the range value $V_0$ to $V_1$ is first stored in the memory 9. The printing pattern data $S1_1$ of the memory 8 are compared and discriminated with the comparison and discrimination value stored in the memory 9, thereby performing the self-discrimination of the first note which is passing at present.

If the case that the previous first note is normal, the printing pattern signal $S_1$ stored in the memory 8 is erased when the next second note is passed, and the printing pattern signal $S1_2$ of the second note is stored in the memory 8. The average value $VS_2$ and the range value $V_2$ to $V_3$ shown in FIG. 3(b) are calculated as the comparison and discrimination value at the length $L_1$ of the note based on the printing pattern signal $S1_2$ similarly to the previous time, and the comparison and discrimination value is stored in the memory 10 this time.

Then, the comparison and discrimination value stored in the memory 10 is mutually compared with the comparison and discrimination value of the previous time stored in the reference value memory 9. This mutual comparison is performed as follows: The range value $V_2$ to $V_3$ of the second note this time are compared with the average value $VS_1$ by the first note at the previous time as shown in FIG. 4(a). When the average value $VS_1$ falls within the range value $V_2$ to $V_3$, the first note at previous time is regarded as being the same type as the second note this time. Then, the range value $V_0$ to $V_1$ of the first note at previous time is compared with the average value $VS_2$ of the second note at this time as shown in FIG. 4(b), and when the average value $VS_2$ falls within the range value $V_0$ to $V_1$, the comparison and discrimination value (average value $VS_2$ and range value $V_2$ to $V_3$) of the second note at this time is regarded as being normal.

Then, the comparison and discrimination value of the second note at this time stored in the memory 10 regarded as being normal is compared with the printing pattern signal $S1_2$ (FIG. 3(b)) at this time stored in the memory 8, thereby discriminating the defect of the second note itself.

When the note is normal in any range in the above described mutual comparison and self-discrimination, the first and second notes are discriminated as being the same or normal. The previous comparison and discrimination value stored in the memory 9 is erased, and the comparison and discrimination value at this time stored in the memory 10 is transferred to the memory 9.

When the third note has passed the photodetector 1, the CPU 5 similarly calculates as the comparison and discrimination value the average value $VS_3$ and the range value $V_4$ to $V_5$ shown in FIG. 3(c), and stores the comparison and discrimination value in the memory 10. The mutual comparison is performed as shown in FIG. 4(c) and (d) between the comparison and discrimination value at the previous time of the second note stored in the memory 9 and the comparison and discrimination value at this time of the third note stored in the memory 10 in the same manner as described above, and then the self-discrimination is performed, if normal, to erase the comparison and discrimination value at previous time stored in the memory 9 and to transfer the comparison and discrimination value of the third note at this time as the comparison and discrimination value of the note passing next to the memory 9. In this manner, the note which passes the photodetector 1 is discriminated with the comparison and discrimination value sequentially updated as described above.

Figure 5:
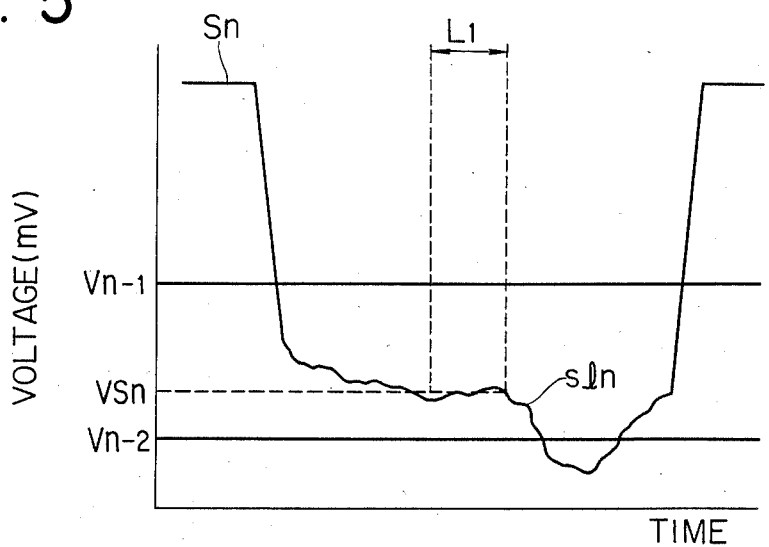

FIG. 5 shows the case when that part of the printing pattern signal $S1_n$ is out of the predetermined range value $V_{n-2}$ to $V_{n-1}$ when the above described self-discrimination is performed. In this case, the CPU 5 discriminates the note as defective, and a defect signal is outputted from the output terminal 11 shown in FIG. 1.

Figure 6A:
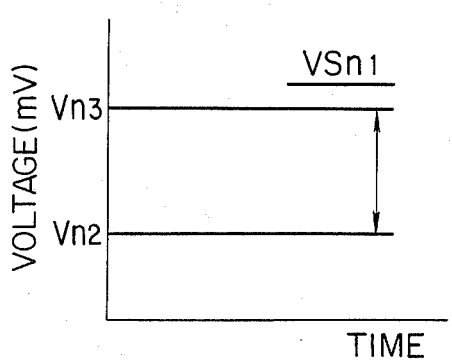
Figure 6B:
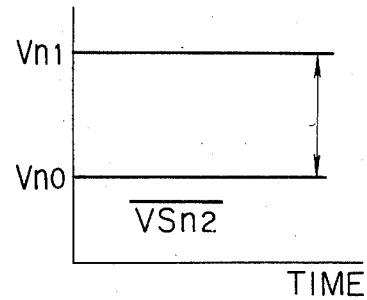

FIG. 6 shows the case when a defect signal is generated upon the mutual comparison, in which case the average value $V_{sn1}$ at the previous time is out of the range value $V_{n2}$ to $V_{n3}$ at this time (FIG. 6(a)) and the average value $V_{sn2}$ at this time is out of the range value $V_{n0}$ to $V_{n1}$ at previous time (FIG. 6(b)). When at least one of the cases shown in FIG. 6(a) and (b) occurs, a defect signal is outputted from the output terminal 11 similarly to the above.

Figure 7:
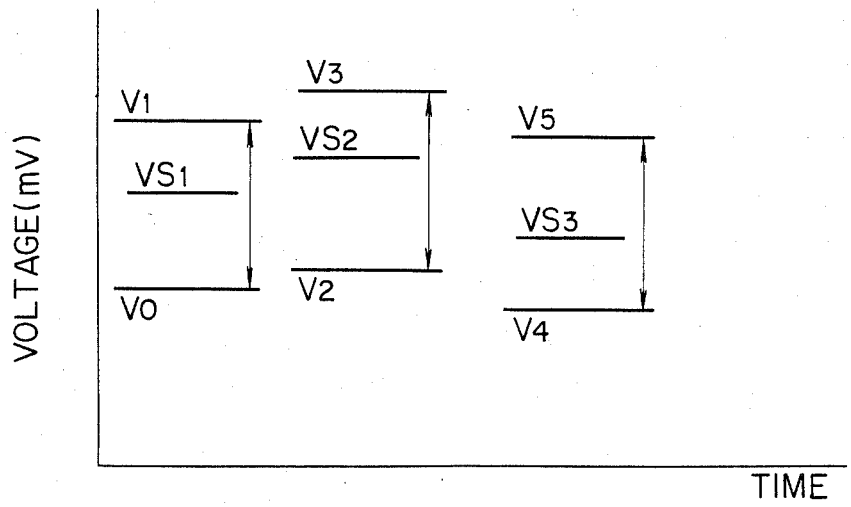

FIG. 7 shows the manner of the variations in the range value and the average value of the comparison and discrimination value when the first to third notes have passed.

When the above described comparison and discrimination values and the values of the number of pulses $P_1$ to $P_n$ from the encoder are employed, the defects of the note such as a mixture of a different type note, a contamination of a note, the shape of the note, the front surface of the note back side can be discriminated, and the conveying defect of the note such as the attitude of the note, the double feeding of the superposed notes, continuous feeding of continued notes can be discriminated.

According to the present invention as described above, the comparison and discrimination value is always updated whenever the note is passed, and the note passing through the detector is sequentially discriminated based on the updated comparison and discrimination value. Therefore, even if the sensitivity of the detector is gradually varied, no erroneous operation occurs due to the influence of the variation.

What is claimed is:

1. In a method of dicriminating a sheet comprising passing one-by-one a plurality of sheets of the same type before at least one photodetector, said photodetector producing printing pattern signals or respective sheets thus passed before the photodetector, and determining the defect of the sheet by comparing said printing pattern signals with stored printing pattern signal, wherein the improvement comprises:

generating pulses while each sheet is passing before said photodetector and counting the number of pulses for determining the length of each sheet;

calculating and storing, in a first, reference storage means, a first comparison and discrimination value based on counted pulses and the printing pattern signals produced by said photodetector for one of said sheets;

calculating and storing, in a second storage means, a second comparison and discrimination value based on counted pulses and the printing pattern signals produced by said photodetector for the next succeeding sheet which passes before said photodetector;

comparing said second comparison and discrimination value with said first comparison and discrimination value; and when the second comparison and discrimination value is normal as determined by comparing said second comparison and discrimination value with said first comparison and discrimination value, erasing the first comparison and discrimination value from said first, reference storage means and transferring said second comparison and discrimination value from said second storage means to said first, reference storage means;

whereby the comparison and discrimination value of a preceding sheet in said first, reference storage means is replaced by the comparison and discrimination value for the next succeeding normal sheet and each succeeding sheet passing before the photodetector is measured for normalcy by the comparison and discrimination value of said preceding sheet.

2. The method as claimed in claim 1, wherein said second comparison and discrimination value is derived from the average value of the second printing pattern signal from a predetermined part of the length of said sheet, and from the predetermined range value of the printing pattern signal which is calculated from the average value.

3. The method as claimed in claim 2, wherein the comparison between the first comparisonn and discrimination value stored in said first, reference value storage means and the second comparison and discrimination value stored in said second storage means comprises the step of confirming that the average value of the first comparison and discrimination value falls within the predetermined range of the second comparison and discrimination value, and the step of confirming that the average value of the second comparison and discrimination value falls within the predetermined range of the first comparison and dicrimination value.

* * * * *

UNITED STATES PATENT AND TRADEMARK OFFICE
CERTIFICATE OF CORRECTION

PATENT NO. : 4,578,770

DATED : March 25, 1986

INVENTOR(S) : T. MITANI

It is certified that error appears in the above-identified patent and that said Letters Patent is hereby corrected as shown below:

Column 1, line 35, after "adhere", the word --to-- should be inserted.

Column 1, line 45, after "aging", the word --change-- should be inserted.

Column 2, line 50, after the second occurrence of the numeral "7" and before "thus", a comma should be inserted.

Column 3, line 31, "$S_1$" should be --$Sl_1$--.

Column 4, line 61, spelling of --discriminating-- should be corrected.

Column 4, line 64, after "signals", "or" should be --of--.

Column 4, line 67, after "pattern", "signal" should be --signals--.

Column 6, line 16, spelling of --comparison-- should be corrected.

UNITED STATES PATENT AND TRADEMARK OFFICE
CERTIFICATE OF CORRECTION

PATENT NO. : 4,578,770

DATED : March 25, 1986

INVENTOR(S) : T. MITANI

It is certified that error appears in the above-identified patent and that said Letters Patent is hereby corrected as shown below:

Column 6, line 26, spelling of --discrimination-- should be corrected.

Signed and Sealed this

Eighth Day of July 1986

[SEAL]

Attest:

Attesting Officer

DONALD J. QUIGG

Commissioner of Patents and Trademarks